US011150714B2

(12) United States Patent
Cui et al.

(10) Patent No.: US 11,150,714 B2
(45) Date of Patent: *Oct. 19, 2021

(54) STORAGE DEVICE AND METHOD FOR POWERING STORAGE DEVICE

(71) Applicant: EMC IP Holding Company LLC, Hopkinton, MA (US)

(72) Inventors: Jesse Xizhi Cui, Shanghai (CN); Alice Aiqin Liu, Shanghai (CN); Haifang Zhai, Shanghai (CN); Tao Yang, Shanghai (CN); Jing Chen, Epping (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/529,520

(22) Filed: Aug. 1, 2019

(65) Prior Publication Data
US 2019/0354157 A1 Nov. 21, 2019

Related U.S. Application Data

(63) Continuation of application No. 15/622,456, filed on Jun. 14, 2017, now Pat. No. 10,481,664.

(30) Foreign Application Priority Data

Jun. 14, 2016 (CN) .......................... 201610417576.7

(51) Int. Cl.
*G06F 1/00* (2006.01)
*G06F 1/30* (2006.01)
(Continued)

(52) U.S. Cl.
CPC .............. *G06F 1/30* (2013.01); *G06F 1/3275* (2013.01); *G06F 1/3287* (2013.01); *G06F 11/14* (2013.01);
(Continued)

(58) Field of Classification Search
CPC .......... G06F 1/30; G06F 11/14; G06F 1/3287; G06F 11/1441; G06F 11/2015; G06F 1/3275; G06F 1/28; Y02D 10/00
See application file for complete search history.

(56) References Cited

U.S. PATENT DOCUMENTS

| 7,051,233 B2 | 5/2006 | Mitsuo et al. |
| 7,240,154 B2 | 7/2007 | Frangioso et al. |

(Continued)

FOREIGN PATENT DOCUMENTS

| CN | 1512379 | 7/2004 |
| CN | 102017359 | 4/2011 |

(Continued)

OTHER PUBLICATIONS

Chinese Office Action issued by The Patent Office of the People's Republic of China dated Sep. 29, 2019 for Chinese Application No. 2016104175767, Serial No. 2019092501902870, English translation included, 19 pages.

*Primary Examiner* — Xuxing Chen
(74) *Attorney, Agent, or Firm* — BainwoodHuang (57) ABSTRACT

Embodiments of the present disclosure provide a storage device and a method for powering the storage. The storage device is powered by a main power supply and the storage device comprises a processor, a baseboard management controller (BMC), a plurality of disks, a first backup power supply and a second backup power supply. The first backup power supply is at least coupled to the processor, and the second backup power supply is at least coupled to the baseboard management controller. Embodiments of the present disclosure enable flexible spatial arrangement of backup power supplies by arranging a plurality of backup power supplies in the storage device.

13 Claims, 6 Drawing Sheets

(51) Int. Cl.
   *G06F 1/3287*   (2019.01)
   *G06F 11/14*    (2006.01)
   *G06F 11/20*    (2006.01)
   *G06F 1/3234*   (2019.01)

(52) U.S. Cl.
   CPC ...... *G06F 11/1441* (2013.01); *G06F 11/2015* (2013.01); *Y02D 10/00* (2018.01)

(56) References Cited

U.S. PATENT DOCUMENTS

| | | |
|---|---|---|
| 7,421,552 B2 | 9/2008 | Long |
| 9,048,690 B2 | 6/2015 | Ito |
| 10,481,664 B2 | 11/2019 | Jing et al. |
| 2012/0036330 A1 | 2/2012 | Hideo et al. |
| 2017/0160779 A1 | 6/2017 | Park et al. |
| 2017/0212569 A1* | 7/2017 | Valdez .................... G06F 1/266 |
| 2017/0322740 A1* | 11/2017 | Gabryjelski ............ G06F 3/067 |
| 2018/0024609 A1* | 1/2018 | Bolt ........................ G06F 1/305 |
| | | 713/323 |

FOREIGN PATENT DOCUMENTS

| | | |
|---|---|---|
| CN | 104253477 | 12/2014 |
| CN | 104346290 | 2/2015 |
| TW | 201619749 A | 6/2016 |

\* cited by examiner

STORAGE DEVICE AND METHOD FOR POWERING STORAGE DEVICE

RELATED APPLICATIONS

This application is a continuation of U.S. patent application Ser. No. 15/622,456 filed Jun. 14, 2017 entitled STORAGE DEVICE AND METHOD FOR POWERING STORAGE DEVICE, which claims benefit of the priority of Chinese Patent Application No. CN201610417576.7 filed Jun. 14, 2016 entitled STORAGE DEVICE AND METHOD FOR SUPPLYING POWER TO STORAGE DEVICE.

FIELD

Embodiments of the present disclosure generally relate to the field of storage technology, and more specifically, to a storage device comprising a plurality of backup power supplies and a method for powering the storage device.

BACKGROUND

A storage device is a disk device that can store data, and it generally includes one or more volatile and non-volatile memories. The volatile memories are used to store running code and operation data, but data stored thereon would be lost automatically if the electricity is turned off. The non-volatile memories are used to permanently store data which can still be maintained when the electricity is turned off, thereby maintaining data persistency and integrity. Generally, the reading and writing speed of non-volatile memories is lower than that of volatile memories.

To prevent data loss, a large backup power supply (for example, a rechargeable battery) is generally arranged in the storage device. If the storage device has a power failure, the backup power supply can act as an emergency power supply to store data that is not stored permanently After the data storage operation is completed, the processor or controller of the storage device issues a signal to turn off the backup power supply. Once the main power supply is restored, the storage device comes back to normal operation.

SUMMARY

Embodiments of the present disclosure provide a storage device comprising a plurality of backup power supplies and a method for powering the storage device. Embodiments of the present disclosure enable flexible spatial arrangement of backup power supplies by arranging a plurality of backup power supplies in the storage device.

According to an aspect of the present disclosure, there is provided a storage device. The storage device, is powered by a main power supply and includes a processor, a baseboard management controller (BMC), a plurality of disks a first backup power supply and a second backup power supply. The first backup power supply is at least coupled to the processor and the second backup power supply is at least coupled to the BMC.

According to another aspect of the present disclosure, there is provided a method for powering a storage device. The method comprises detecting a failure of a main power supply of the storage device. The method further comprises in response to detecting the failure of the main power supply, enabling a first backup power supply to at least supply power to a processor and enabling a second backup power supply to at least supply power to a baseboard management controller (BMC).

According to still another aspect of the present disclosure, there is provided a computer readable storage medium which contains computer readable program instructions stored thereon. These computer readable program instructions can be used to implement the actions of the method described in the embodiments of the present disclosure.

This Summary is provided to introduce a selection of concepts, in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example implementations of the present disclosure will become more apparent. In the example implementations of subject matter described herein, the same reference sign usually represents the same element.

DETAILED DESCRIPTION

The disclosures of U.S. patent application Ser. No. 15/622,456 filed Jun. 14, 2017 entitled STORAGE DEVICE AND METHOD FOR POWERING STORAGE DEVICE and Chinese Patent Application No. CN201610417576.7 filed Jun. 14, 2016 entitled STORAGE DEVICE AND METHOD FOR SUPPLYING POWER TO STORAGE DEVICE are hereby incorporated herein by reference in their entirety.

Preferred embodiments of the present disclosure will be described in the following text in greater detail with reference to the drawings. Although preferred embodiments of the present disclosure are displayed in the drawings, it should be understood that the present disclosure are not limited to the implementations illustrated herein. On the contrary, these implementations are provided to make the present disclosure thorough and more complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on," The term "one example implementation" and "an example implementation" are to be read as "at least one example implementation." The term "another implementation" is to be read as "at least one other implementation." Terms "a first", "a second" and others can refer to different or identical objects. The following text may also contain other explicit or implicit definitions.

In the embodiments of the present disclosure, the term "backup power supply" refers to a power supply which stays in backup state under normal conditions and powers the device or system when the main power supply is turned off. The examples of the backup power supply include, but are not limited to, a common backup power supply consist of alkaline batteries, an uninterrupted power supply (UPS) consist of lithium ion battery or lithium polymer battery and the like. In the embodiments of the present disclosure, the term "disk" refers to a non-volatile memory that stores data permanently. The examples of the disk include, but are not limited to, a hard disk drive (HDD), an optical disk drive and a solid state disk (SSD) and so on. In the embodiments of the present disclosure, the term "baseboard management controller (BMC)" refers to a controller that, monitors physical parameters of some or all of the components in the device, which generally communicates with the processor via a management interface. The examples of this interface include, but are not limited to, an intelligent platform management platform (IPMI) and the like.

To prevent data loss, traditional storage device is usually configured with a single large backup power supply. However, since the traditional backup power supply needs to power the whole storage device, it is usually large in size and thus, occupies large space in the storage device. Moreover, since the capacity and size of the backup power supply in the conventional storage are usually fixed, it is impossible to adopt different configurations for different devices or systems. Therefore, for a device or system with a low consumption, a fixed backup power supply would cause a waste of the energy.

Embodiments of the present disclosure provide a storage device comprising a plurality of backup power supplies and a method for powering the storage device. In the embodiments of the present disclosure, a plurality of small backup power supplies are arranged in the storage device so as to replace the traditional single large backup power supply, and the plurality of small backup power supplies can be disposed in a plurality of proper positions separately in the storage device. Thus, embodiments of the present disclosure enable flexible spatial arrangement of the backup power supplies, and provide a distributed power supply. Furthermore, in the embodiments of the present disclosure, a backup power supply is arranged in a disk among a plurality of disks in order to store data from the memory, thereby providing a backup, power supply for the disk with a low cost to prevent data loss. In addition, the embodiments of the present disclosure can manage a plurality of small backup power supplies with a uniform interface through BMC such that the backup power supplies can not only be expandable but also can be configured with different battery capacities for different components, thereby reducing requirement on battery capacity of the backup power supply in the storage device and lowering cost of the storage device.

Figure 1:
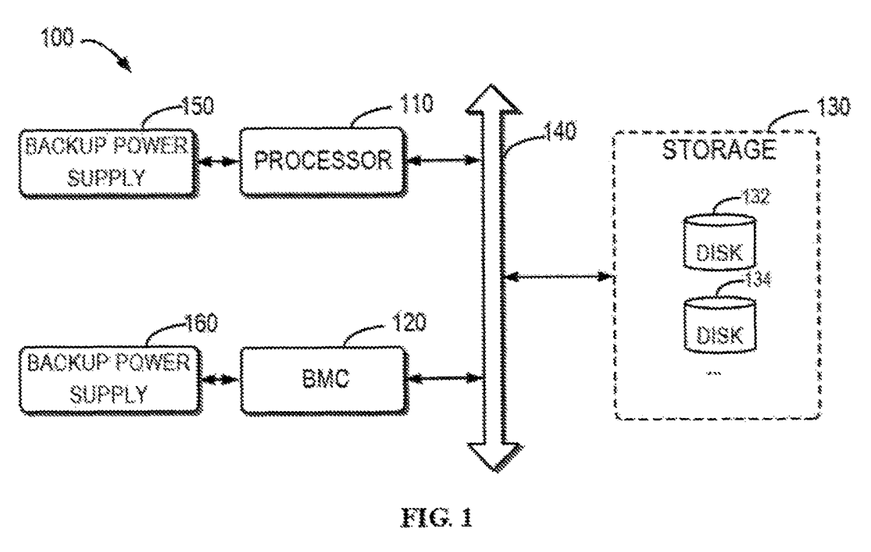
FIG. 1 is an example block diagram illustrating a storage device according to some embodiments of the present disclosure.

FIG. 1 is an example block diagram illustrating a storage device 100 according to some embodiments of the present disclosure. As shown in FIG. 1, the storage device 100 includes a processor 110, a BMC 120 and a storage 130 which includes a plurality of disks, such as disk 132, disk 134 and so on. The storage device 110, the BMC 120 and the storage 130 are connected with each other via the bus 140 which may be of a structure of any proper type, such as the memory bus, the peripheral bus, the external bus, and/or a local bus using any type of available bus architecture. The bus architecture includes, but not limited to, industrial standard architecture (ISA), microchannel architecture (MSA), peripheral component interconnect (PCI), personal computer memory card international association bus (PCM-CIA) and a small computer system interface (SCSI) and so on. Those skilled in the art should appreciate that the storage device 100 may further include the additional one or more components.

The disk 132 and disk 134 and so on in the storage 130 are non-volatile memories for storing data permanently, which may be a hard disk driver (HDD), a solid state disk (SSD) or a combination of HDD and SSD. Alternatively, the number of disks in the storage 130 may be between several and the hundreds and the total capacity of the storage 130 can be between several TBs to thousands of TBs. Furthermore, disks in the storage 130 may have different various of dimensions and multiple capacities.

The storage device 100 is powered by the main power supply (not shown) which supplies power to the storage device 100 when the external power supply is in normal operation, Optionally, the main power supply can be located inside the storage device 100. Alternatively, the main power supply can also be disposed outside of the storage device 100 and connected to the storage device 100 via a power supply line.

As shown in FIG. 1, the storage device 100 may further include a backup power supply 150 (referred to as a first backup power supply) and a backup power supply 160 (referred to as a second backup power supply). The first backup power supply 150 is at least coupled to the processor 110, and the second backup power supply 160 is at least coupled to BMC 120, In some implementations, the first backup power supply 150 and the second backup power supply 160 may be alkaline batteries or lithium ion batteries, and the battery capacity of the first backup power supply 150 may be the same as or different from that of the second backup power supply 160. In some implementations, the interface type of the first backup power supply 150 and that of the second backup power supply 160 may be the same. For instance, the first backup power supply 150 and the second backup power supply 160 include the same type of power supply interface and signal interface.

The storage device 100, according to the embodiments of the present disclosure, may be configured with different backup power supplies, for example, the first backup power supply 150 and the second backup power supply 160. In some implementations, both the capacity and the size of these backup power supplies 150 and 160 may be smaller than a traditional single large backup power supply. Therefore, a plurality of small backup power supplies may be arranged separately in a plurality of proper positions inside the storage device, thereby enabling flexible spatial arrangement of the backup power supplies and providing a distributed power supply.

In some implementations, the storage device may further include a storage processor board (not shown), and the processor 110 and the BMC 120, the first backup power supply 150 and the second backup power supply 160 may be located on the storage processor board. In another implementation, the storage device may include two storage processor boards that may be a backup of each other as a mirror image, and each storage processor board may include a processor, a BMC, a first backup power supply and a second backup power supply.

In some implementations, both the first backup power supply 150 and the second backup power supply 160 may be configured to supply power to the storage device 100 in response to the failure of the main power supply. For example, the backup power supply can be controlled by the BMC 120, if the main power supply of the storage device is detected to have a failure, the BMC 120 may enable the first backup power supply 150 and/or the second backup power supply 160 to supply power to all the components in storage device 100. For example, the first backup power supply 150 may supply power to the processor 110, the BMC 120 and storage 130. By allowing each backup power supply to supply power to all the components in the storage device, even if one backup power supply has insufficient quantity of electricity or has a failure, another backup power supply may still supply power to the whole storage device. In this manner, reliability of backup power supply can be effectively guaranteed.

Alternatively, in some implementations, the first backup power supply 150 and/or the second backup power supply 160 may be specifically used to supply power to a particular component in the storage device 100. For example, in some implementations, if the failure of the main power supply is detected, the BMC 120 may enable the first backup power supply 150 to supply power to the processor 110 (and/or other particular components) and enable the second backup power supply 160 to supply power to the BMC 120 (and/or other particular components). In particular, in some implementations, the first backup power supply 150 may be enable to only supply power to the processor 110, while the second backup power supply 160 may be enable to only supply power to BMC 120. In other words, each backup power supply is dedicated and supplies power only to one or more particular components. Optionally, each backup power supply may only supply power to one or more components directly connected to this backup power supply. By configuring each backup power supply to supply power to one or more particular components in the storage device, different capacities and/or specifications of backup power supplies can be configured according to the features and requirements of different components.

In some implementations, the battery capacity of the first backup power supply 150 is associated with the power level of processor 110, and the second backup power supply 160 is associated with the power level of BMC 120. For example, the battery capacity of the first backup power supply 150 may be in proportion with the power level of the processor 110. In other words, if the power level of processor 110 is large, the battery capacity of the first backup power supply 150 should be also large. Therefore, dedicated backup power supplies with different battery capacities can be configured for components with different powers such that the component with lower power level is only configured with a backup power supply with a small capacity, thereby saving battery capacity as well as cost of the backup power supply.

In some implementations, the BMC 120 may be configured to obtain the electric quantity of the first backup power supply 150 (called "a first electric quantity") and the electric quantity of the second backup power supply 160 (called "a second electric quantity"). If both the first and second electric quantities are above the threshold electric quantity, the writing cache mode of storage device 100 can be enabled, which means that the writing operation(s) of data in the storage device is first written into the cache, and then written into the disk when reaching an accumulated amount of threshold. On the other hand, if at least one of the first electric quantity and the second electric quantity is below the threshold electric quantity, then the writing cache mode of storage device 100 may be disabled. It is beneficial to configure the operation mode of storage device by detecting the electric quantity of each backup power supply, which not only improves the storage efficiency of the storage device but also ensures the security of data storage.

Figure 2:
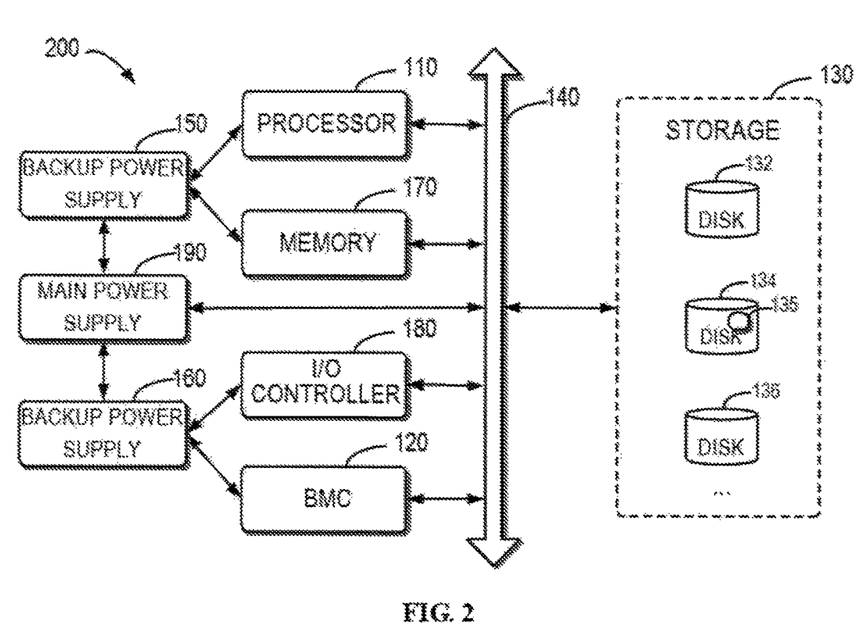
FIG. 2 is an example block diagram illustrating a storage device according to some other embodiments of the present disclosure.

FIG. 2 is an example block diagram illustrating a storage device 200 according to some other embodiments of the present disclosure. The storage device 200 depicted in FIG. 2 is only an example implementation rather than any limit to the scope of the implementation of the present disclosure. As shown in FIG. 2. compared with the storage device 100 shown in FIG. 1, the storage device 200 further includes a memory 170, an input/output (I/O) controller 180 and a main power supply 190.

As shown in FIG. 2, the main power supply 190 is coupled to bus 140 as well as the first backup power supply 150 and the second backup power supply 160. Therefore, the main power supply 190 may supply power to the storage device 200 under normal working mode and charge the first backup power supply 150 and the second backup power supply 160. Alternatively the main power supply 190 can also be located outside of the storage device 200 and connected to the storage device 200 via the power supply line.

In the example shown in FIG. 2, the first backup power supply 150 is coupled to the processor 110 and the memory 170, and the second backup power supply 160 is coupled to the BMC 120 and the I/O controller 180. In some implementations, if the main power supply 190 is detected to have a failure, the BMC 120 may enable the first backup power supply 150 to supply power to the processor 110 and the memory 170, and enable the second backup power supply 160 to supply power to the BMC 120 and the I/O controller 180. Optionally, in some implementations, the battery capacity of the first backup power supply 150 may be related to, for instance, in proportion with, a sum of the power value of the processor 110 and the power value of the memory 170. The battery capacity of the first backup power supply 160 may be related to, fix example, in proportion with, a sum of the power value of BMC 120 and the power value of the I/O controller 180. In this manner, a backup power supply with small battery capacity can be configured for a component with small power value, thereby saving battery capacity and cost of the backup power supply.

Still referring to FIG. 2, as stated above, the storage 130 includes a plurality of disks, such as disk 132, disk 134, disk 136 and so on. Generally, in these disks, one or more disks (such as disk 134) may be configured to store data from the memory 170 directly. Therefore, when the main power supply 190 of storage device 200 has a failure, a feasible power supply scheme is to only supply power for the disk 134 which directly stores data from memory 170 by use of the backup power supply so as to ensure that data in the memory 170 will not be lost. Other disks 132 and 136 do not need supply from the, backup power supply.

In particular, in some implementations, a third backup power supply 135 may be arranged in the disk 134 for storing data from memory 170. Conversely, the disks 132 and 136 do not need associated backup power supply. The disks 132 and 136 are not used to store data from the memory 170 directly and therefore, do not need to perform operation(s) after the main power supply 190 has a failure. In this way, the requirement for battery capacity of the backup power supply in storage device 200 can be reduced, thereby reducing the cost of the storage device.

In some implementations, one or more disks (such as disk 134) for storing data from memory 170 may include a disk box with a larger dimension and a disk body with a smaller dimension. It should be noted that the disk box of disk 134 is not only larger than the disk body in size but also differs from the disk body in specification. In other words, for such disk 134, the specifications of the disk box and the disk body do not match with each other. For example, in some implementations, the disk 134 may have a disk box of 3.5 inches and a disk body of 2.5 inches; for another example, disk 134 may be configured with a disk box of 2.5 inches and a disk body of 1.8 inches and so on. In this manner, the disk box of disk 134 may have sufficient remaining space to arrange the backup power supplies so as to supply power to disk 134 when the main power supply 190 has a failure. The disk box and disk body of any dimension currently known or to be developed in the future may be applied in combination with the embodiments of the present disclosure, where the scope of the present invention is not limited. The example structure of the disk 134 will be described in the following description with reference to FIG. 4.

It is to be understood by those skilled in the art that the storage device 200 may further include other backup power supplies and other components, and the first backup power supply 150 and the second backup power supply 160 may be connected to other components, respectively, and the storage 130 may further include other disks, where the scope of the present invention is not limited.

Figure 3:
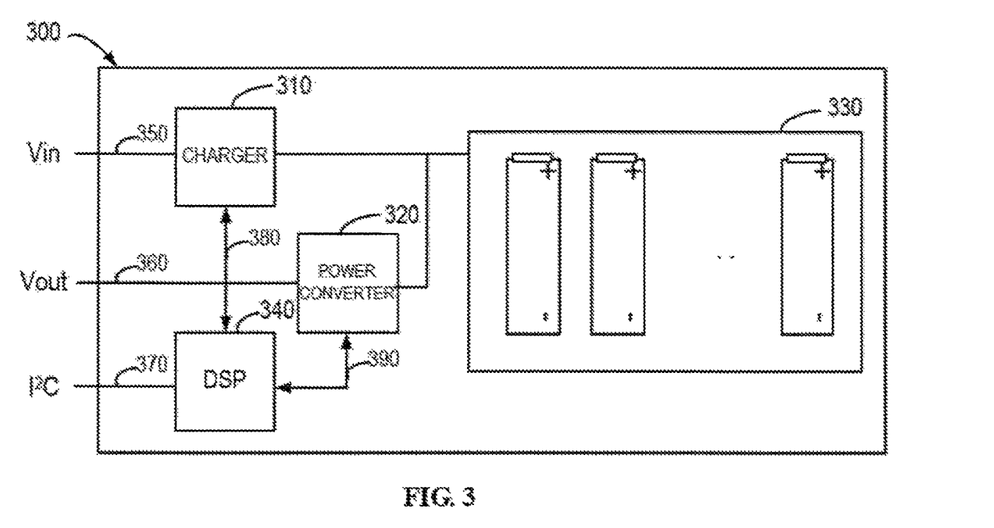
FIG. 3 is an example block diagram illustrating a backup power supply in the storage device according to the embodiments of the present disclosure.

FIG. 3 is an example block diagram illustrating a backup power supply 300 in the storage device according to the embodiments of the present disclosure. It is to be understood that the backup power supply 300 may be represented as the first backup power supply 150 or the second backup power supply 160 as depicted with reference to FIG. 1 and FIG. 2.

As shown in FIG. 3, the backup power supply 300 includes a charger 310, a power converter 320, a battery array 330 and a digital signal processor (DSP) 340, and the battery array may be consist of one or more batteries. The charger 310 may receive external voltage via power supply line 350 to charge the battery array 330. For example, charger 310 may receive voltage from the power supply 190 depicted in FIG. 2, such as voltage of 12V.

The power converter 320 may provide power supply in the battery array 300 to the outside components via the power supply line 360. The power converter 320 may directly output voltage in the battery array 330 or convert voltage in the battery way 330 into a proper voltage to meet particular application requirement. The DSP 340 may be coupled to the charger 310 via the signal line 380 and coupled to the power converter 320 via the signal line 390, and thus it controls the supply of power in power supply 300.

The DSP 340 may communicate with the BMC 120 depicted with reference to FIG. 1 and FIG. 2 via the signal line 370, optionally, the signal line 370 may be I.sup.2C bus. Alternatively, the signal line 370 can also be a general input and output (GPIO) bus. In some implementations, the signal line 370 may provide the following signals: a signal indicating that the backup power supply has been started, a signal indicating that the backup power supply has been ready, or a signal indicating that the backup power supply has a failure. As the backup battery provides a uniform power supply line interface and signal line interface, the BMC 120 may manage or expand the plurality of backup power supplies conveniently.

Figure 4:
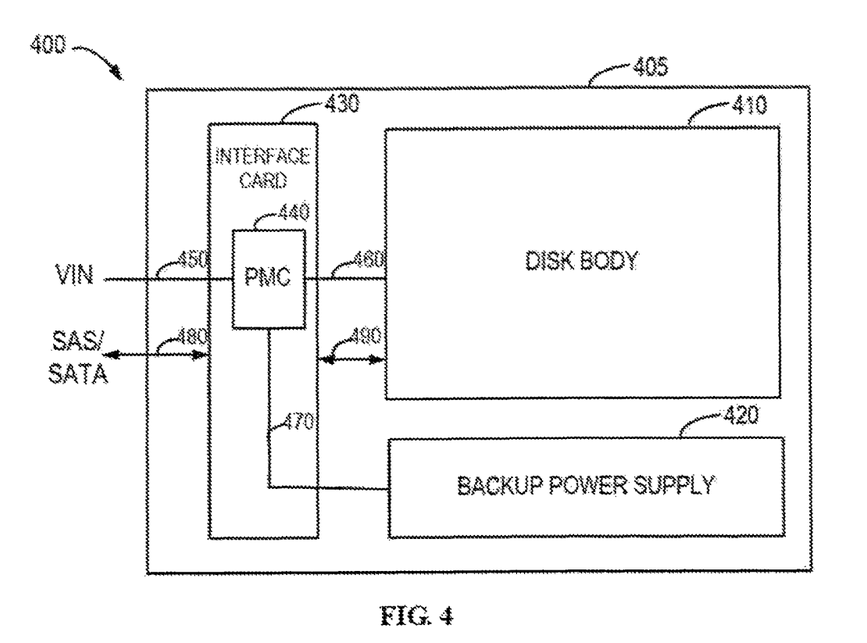
FIG. 4 is an example block diagram illustrating a disk in the storage device for storing data from the memory according to the embodiments of the present disclosure.

FIG. 4 is an example block diagram illustrating a disk 400 in the storage device for storing data from the memory according to the embodiments of the present disclosure. It is to be understood that disk 400 may be an example of the disk 134 as depicted with reference to FIG. 2. As shown in FIG. 4, the disk 400 includes a disk box 405, a disk body 410, a backup power supply 420, an interface card 430 and a power management circuit 440, and the disk body 410 may be of HDD type or SSD type. As stated above, the dimension of the disk box 405 of the disk 400 may be higher than that of the disk body 410. For example, the disk box 405 may be of the dimension of 3.5 inches while the box body 410 may be of the dimension of 2.5 inches. In this way, it can be ensured that disk 400 has sufficient room to accommodate the backup power supply 420.

In some implementations, the interface card 430 may be a plug-in card which may be inserted in the slot of the storage 130 as depicted with reference to FIG. 1 and FIG. 3. The disk 400 may communicate with the disk in the storage 130 via the power supply line 450 and the signal line 480. The signal line 480 may be, for instance, a serial connected small computer system interface (SAS) or parallel advanced technology attachment (SATA). The power management circuit (PMC) 440 may control the backup power supply in disk 400 via the power supply line 460 and the power supply line 470. Furthermore, the interface card 430 may communicate with the disk 410 via the signal line 490.

In some implementations, if the main power supply of the storage device has a failure, the backup power supply 420 in disk 400 may be enable to provide an emergency power supply to complete the operation of storing data in the memory. Therefore, by configuring a backup power supply in a disk for storing data from the memory among all the disks, it is possible to ensure the supply of backup power supply of the disk with a low cost when the main power supply has a failure, thereby saving battery capacity of the backup power supply in the storage device efficiently.

Figure 5:
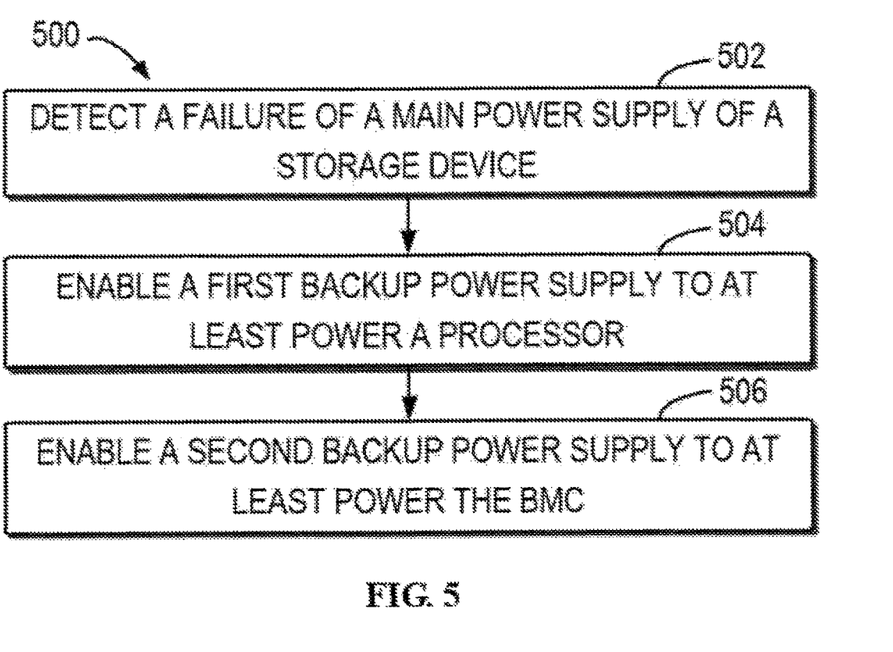
FIG. 5 is a flow diagram illustrating a method for powering the storage device according to the embodiments of the present disclosure.

FIG. 5 is a flow diagram illustrating a method 500 for powering the storage device according to the embodiments of the present disclosure. It is to be understood that method 500 may be implemented by BMC 120 as depicted with reference to FIG. 1 or FIG. 2. At 502, a failure of the main power supply of the storage device is detected. For example, the BMC 120 detects that the main power supply (for instance, the main power supply 190) of the storage device 100 or 200 has a failure, and then the backup power supply (for example, the first backup power supply 150 and the second backup power supply 160) is enabled to supply power to the storage device. At 504, the first backup power supply is enabled to at least power the processor. At 506, the second backup power supply is enabled to at least power the BMC. For example, the BMC 120 causes the first backup power supply 150 to supply power to the processor 110 and the second backup power supply 160 to supply power to the BMC 120.

According to the method 500 of embodiments of the present disclosure, a plurality of smaller backup power supplies are arranged in the storage device to replace the traditional larger single backup power supply, and the plurality of smaller backup power supplies can be disposed in a plurality of proper positions in the storage separately, thereby enabling flexible spatial arrangement of the backup power supplies and providing a distributed power supply.

Figure 6:
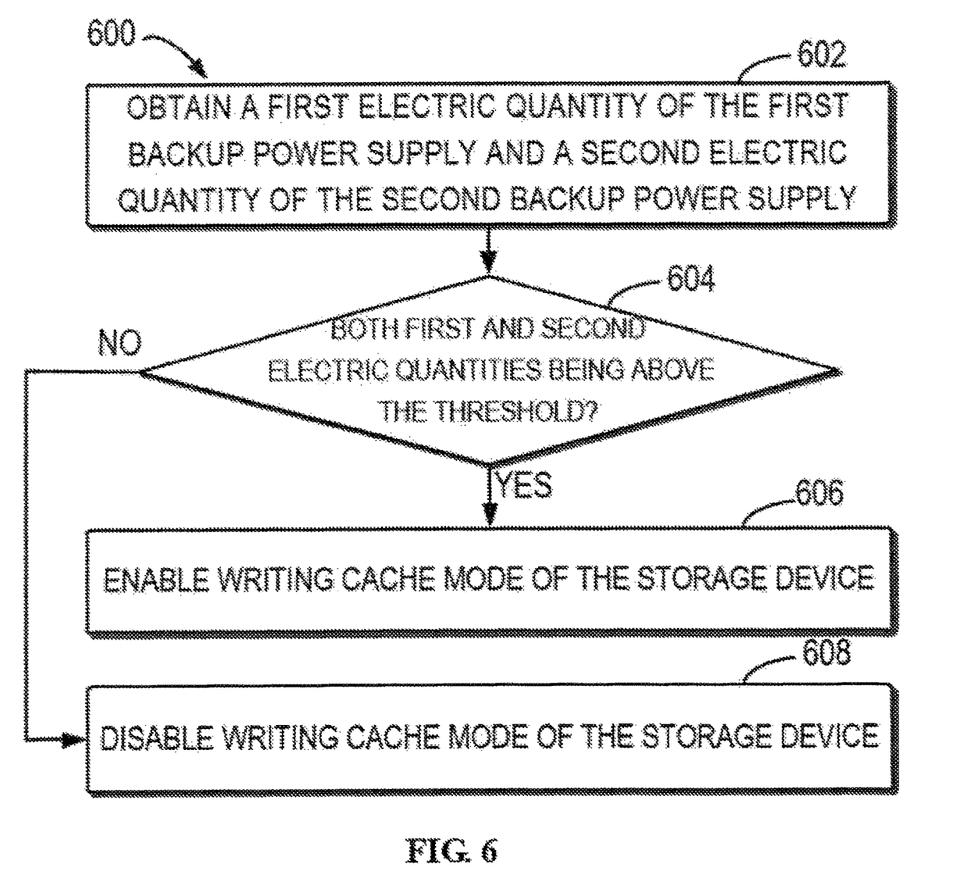
FIG. 6 is a flow diagram illustrating a method for configuring the working mode of the storage device according to the embodiments of the present disclosure.

FIG. 6 is a flow diagram illustrating a method 600 for configuring the working mode of the storage device according to the embodiments of the present disclosure. It is to be understood that method 600 may be implemented by the BMC 120 as depicted with reference to FIG. 1 or FIG. 2. At 602, a first electric quantity of the first backup power supply (for example, the first backup power supply 150) and a second electric quantity of the second backup power supply (for example, the second backup power supply 161)) are obtained. At 604, it is determined whether both the first and second electric quantities are above the threshold electric quantity, for example, the threshold electric quantity may be a preset minimum safe electric quantity, for example, 80% of the battery capacity of the backup power supply.

If both the first and second electric quantities are above the threshold electric quantity, then method 600 proceeds to action 606 where the writing cache mode of the storage device is enabled, for instance, the storage device enters into the complete function mode. If it is not the case that both the first and second electric quantities are above the threshold electric quantity, namely, at least one of the first and second electric quantities is smaller than the threshold electric quantity, the method 600 proceeds to action 608, where the writing cache mode of the storage device is disabled, for example, the storage device does not enter into the degradation state model. Therefore, with the method 600 according to the embodiments of the present disclosure, the operation mode of the storage device may be configured by detecting the electric quantity of each backup power supply, and thus it can not only improve storage efficiency of the storage device but also enhance security of data storage.

In some implementations, the method 500 and/or 600 depicted above may be implemented as a computer program product which may include a computer readable storage medium on which computer readable program instructions to implement various aspects of the present disclosure are carried.

The machine readable storage medium may be a tangible device keeping and storing instructions used by the instruction executing device. The machine-readable medium may include, but not limited to, electronic, magnetic, optical, electro-magnetic, semiconductor storage device or any suitable combination of the foregoing. More specific examples (non-exhaustive list) of the machine readable storage medium include: a portable computer disk, a hard, disk, a random access memory (RAM), a read only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanical encoding device, such as a punched card with instructions stored thereon or a groove in the convex structure, or any suitable combination of the foregoing. The machine readable storage medium used here is not interpreted as the instantaneous signal per se, such as radio wave or other electromagnetic waves that are propagated freely, electromagnetic waves propagated through waveguide or other transmission medium (e.g. optical pulse through optical fiber cable) or electrical signals transmitted over electrical lines.

The machine readable program instructions described herein may be loaded from the machine readable storage medium to the computing/processing devices, or to the external computers or external storage devices through network, such as Internet, LAN, WAN and/or wireless network. The network may comprise copper transmission cable, optical fiber transmission, wireless transmission, router, firewall, interchanger, network gateway computer and/or edge server. The network adapter card or network interface in each computing/processing device receives machine readable program instructions from the network and forwards the machine readable program instructions for storage in the machine readable storage medium in each computing/processing device.

The computer program instructions for implementing operations of the present disclosure may be assembly instruction, instruction set architecture (ISA) instructions, machine instructions, machine related instructions, microcode, firmware instructions, status configuration data or source code or target code complied with one or any combination of multiple programming languages. The programming languages include object-oriented programming language-such as Smalltalk, C++ language and so on, and conventional processing programming language-such as "C" language or similar programming language. The machine readable program instructions can be wholly or partly executed on the user computer, executed as an independent software packet, partly executed on the user computer and partly executed on the remote computer, or wholly executed on the remote computer or server. In the case involving remote computer, the remote computer can be connected to the user computer via any kind of computers, including LAN or WAN, or can be connected to the exterior computer (e.g. connected via Internet with Internet service provider). In some implementations, the electronic circuitry is customized with status information of machine readable program instructions, such as programmable logical circuitry, field programmable gate array (FPGA) or programmable logical array (PLA). The electronic circuitry can implement machine readable program instructions and thus implement various aspects of the present disclosure.

These machine readable program instructions may be provided to a universal computer, a dedicated computer or a processing unit of other programmable data processing apparatuses to generate a machine so that the instructions, when implemented by computer or other programmable data processing apparatuses, cause the function/operation specified by one or more blocks of the flowchart and/or block diagram to be implemented. These machine readable program instructions can also be stored in the computer readable storage medium and cause the computer, the programmable data processing apparatus and/or other devices to work in a specific manner so that the computer readable medium with instructions stored thereon includes a manufacturing product which contains instructions to implement function/action specified in one or more blocks in the flowchart and/or block diagram.

Machine readable program instructions may also be loaded to the computer, other programmable data processing apparatuses, or other devices so that a series of operation procedures are executed in the computer, other programmable data processing apparatuses or other devices to generate a process implemented by computer so that instructions executed on the computer, other programmable data processing apparatuses or other devices implement function/action specified in one or more blocks in the flowchart and/or block diagram.

The flowchart and the block diagram in the drawings illustrate the architecture, function and operation that may be implemented with the system, method and computer program product in accordance with the embodiments of the present disclosure. In this aspect, each block in the flow diagram or block diagram may represent a module, a program segment, or a portion of instructions that comprise one or more executable instructions to implement the specified logical functions. In some alternative implementations, the functions marked in the blocks may also occur in an order different from that marked in the drawings. For example, two blocks shown successively can actually be implemented substantially in parallel or even be implemented in a reverse order depending on the function. It is also worth noting that each block in the flow diagram and/or block diagram and combination of the blocks in the flow diagram and/or block diagram may be implemented with the function specified by the implementation or operation-dedicated hardware-based system or a combination of a dedicated hardware and computer instructions.

Various embodiments of the present disclosure have been described above. The above description is only example and not exhaustive and is not limited to the embodiments of the present disclosure. Many modifications and variations are obvious for those skilled in the art, without departing from the scope and spirit of the various implementations described above. The selection of terms in the text intends to explain principles of the implementations, practical application or technological improvement in market at best or to enable those skilled in the art to understand embodiments of the present disclosure.

What is claimed is:

1. A storage device powered by a main power supply, comprising:
    a processor;
    a baseboard management controller (BMC);
    a plurality of disks;
    a plurality of backup power supplies including a first backup power supply and a second backup power supply,
    wherein the first backup power supply is coupled to at least the processor and the BMC,
    wherein the second backup power supply is coupled to at least the BMC,
    wherein the second backup power supply is different from the first backup power supply, and
    wherein the BMC is configured to:
        in response to detection of a failure of the main power supply, control the plurality of backup power supplies to cause and enable the first backup power supply to supply power to at least the processor and to cause and enable the second backup power supply to supply power to at least the BMC.

2. The storage device according to claim 1, further comprising:
    a memory; and
    a third backup power supply arranged in at least one of the plurality of disks, the at least one disk being used to store data from the memory.

3. The storage device according to claim 2, wherein the at least one disk comprises a disk box and a disk body, and the dimension of the disk box is larger than the dimension of the disk body.

4. The storage device according to claim 1, wherein the first and second backup power supplies are further coupled to the main power supply in order to be charged by the main power supply.

5. The storage device according to claim 1, wherein the BMC is configured to:
    in response to detecting a failure of the main power supply, enable at least one of the first and second backup power supplies to power the storage device.

6. The storage device according to claim 1, wherein the first backup power supply is enabled to only power the processor, and the second backup power supply is enabled to only power the BMC.

7. The storage device according to claim 6, wherein a battery capacity of the first backup power supply is associated with a power level of the processor, and a battery capacity of the second backup power supply is associated with a power level of the BMC.

8. The storage device according to claim 1, further comprising:
    a memory; and
    an input/output (I/O) controller, the first backup power supply being further coupled to the memory, and the second backup power supply being further coupled to the I/O controller.

9. A method for powering a storage device, comprising:
    detecting, by a baseboard management controller (BMC), a failure of a main power supply of a storage device, the storage device including at least a processor, a plurality of disks, a plurality of backup power supplies including a first backup power supply and a second backup power supply, the second backup power supply being different from the first backup power supply; and
    in response to detecting the failure of the main power supply, controlling, by the BMC, the plurality of backup power supplies,
    wherein controlling the plurality of backup power supplies includes causing and enabling, by the BMC, the first backup power supply to power at least the processor, and causing and enabling, by the BMC, the second backup power supply to power at least the BMC.

10. The method according to claim 9, further comprising:
    in response to detecting the failure of the main power supply, enabling a third backup power supply in the storage device to power at least one of the plurality of disks in order to store data in a memory of the storage device into the at least one disk.

11. The method according to claim 10, wherein the at least one disk comprises a disk box and a disk body, and the dimension of the disk box is larger than the dimension of the disk body.

12. The method according to claim 9, wherein the enabling the first backup power supply to at least power the processor comprises enabling the first backup power supply to only power the processor, and the enabling the second backup power supply to at least power the BMC comprises enabling the second backup power supply to only power the BMC.

13. The method according to claim 12, wherein a battery capacity of the first backup power supply is selected based on a power level of the processor, and a battery capacity of the second backup power supply is selected based on a power level of the BMC.

* * * * *